Feb. 16, 1937.  F. A. HAMANN  2,070,727
ELASTIC PAD FOR SPRINGLESS HERNIA BANDAGES
Filed Sept. 27, 1935
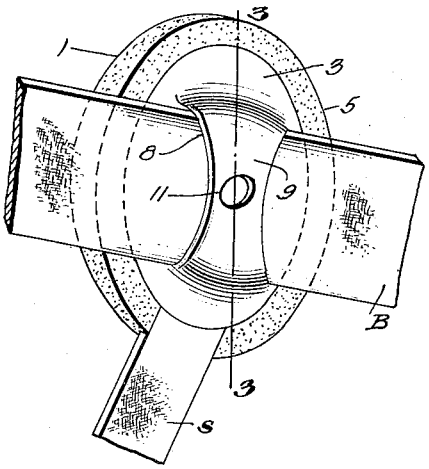
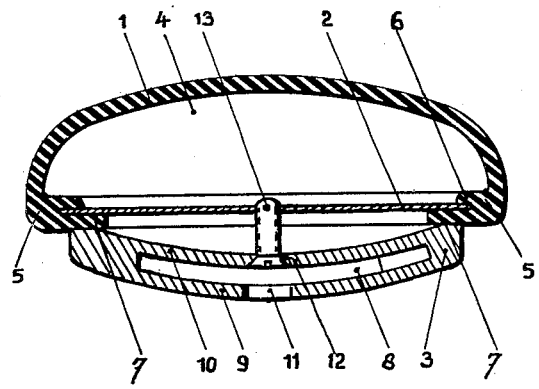
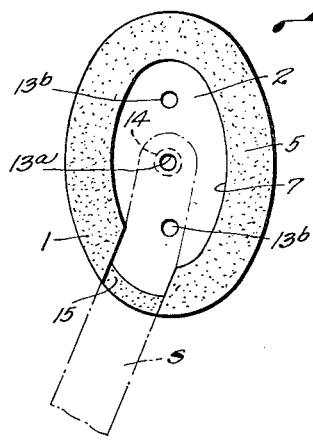
Inventor
F. A. Hamann,
by Chas. J. Williamson
Atty.

Patented Feb. 16, 1937

2,070,727

UNITED STATES PATENT OFFICE 2,070,727

ELASTIC PAD FOR SPRINGLESS HERNIA BANDAGES

Friedrich Albert Hamann, Velp, Netherlands

Application September 27, 1935, Serial No. 42,523
In the Netherlands October 6, 1934

4 Claims. (Cl. 128—117)

My invention relates to an elastic pad for springless hernia bandages and has for its object to provide a pad which can be easily cleaned. A further object of my invention is to afford a simple construction, a reliable and efficient application of the requisite and uniform pressure, and a maximum comfort to the wearer. My invention makes the application of a shank belt superfluous. Further according to my invention no hard edges come into contact with the body of the wearer.

Further advantages of my invention will be apparent from the following description relating to a preferred embodiment of my invention as shown in the drawing; the features of my invention being contained in the claims.

Referring to the drawing in which is disclosed one embodiment of my invention, Fig. 1 shows a perspective view of my invention; Fig. 2 is a view of the pad with cover plate removed; and Fig. 3 is a transverse section view taken on line 3—3 of Fig. 1.

In the drawing 1 is a rubber pad or so called pelotte; 2 is a hard base plate, e. g. from aluminium and 3 is the covering plate, which may be made of metal, hard rubber, bone, celluloid or a different artificial mass. The pad 1 is of elastic rubber and of a hollow oval shaped form, thus forming an air chamber 4. The chamber 4 may also be filled with an elastic mass, e. g. of sponge rubber or the like.

The base pate 2 contains an opening or hole 13a provided with screwthread to screwthreadedly receive the screw 13. The edges of the base plate 2 fit in a U-shaped opening of the horizontal edge 5 of the rubber pad 1. The legs 6 and 7 forming together the U-shaped opening hold the aluminium base plate 2 in place.

The arched covering plate 3 contains a slot 8 for shifting the pad on the body belt B, on which the pad is adjustable in any position. The parts 9 and 10 of the cover plate 3 enclose the opening 8. The part 9 possesses an opening 11 of which the walls are substantially straight. The part 10 possesses an opening 12 of which the walls taper in the direction of the pad. The plates 2 and 3 are pulled together by means of a screw bolt 13, so causing the legs 7 of the edge 5 of the elastic pad 1 to be pressed between the plates 2 and 3.

As goes forth from the drawing the rubber pad 1 covers the edge of the metal base plate 2 so that no hard edges come into contact with the body of the wearer.

As stated above a shank belt S is superfluous in most cases. If, however, a shank belt is desired, a ring 14 is applied to the end of this belt which ring is arranged around the screw bolt 13. When using a shank belt S, a part of the leg 7 of the edge 5 is cut away at the point 15 where the shank belt projects outside the plates 2 and 3.

As stated above my hernia bandage is springless and comprises a pneumatic rubber pad, no hard edges coming into contact with the body of the wearer. Further the skin of the wearer cannot be pinched between the rubber pad and the hard plate. There is also obtained the considerable advantage that due to the arched covering plate a uniform pressure is guaranteed over the whole surface of the rubber pad. In consequence thereof the pad presses faster on the hernia and wearing a shank belt becomes superfluous. At any rate, wearing of the bandage according to my invention is much more agreeable as when using a bandage according to my invention the same has not to be pulled so strongly as when using known bandages with a flat covering plate.

Due to the arched covering plate the bandage is much less visible than in the case of bandages in which the resilient pads are arranged on hard, flat plates with sharp edges.

Another considerable advantage of my invention consists in the fact that the covering plate can be adjusted towards or from the pad so that a smaller or larger pressure can be exercised, just as required by the wearer.

In view of the fact that the covering plate 2 can turn around the screw bolt 13 in a horizontal plane, the pad can be adjusted in the proper situation with respect to the hernia. Further all parts are made exchangeable, because by releasing the screw bolt 13 all parts are made detachable.

By applying further openings 13b in the plate 2 the pad can also be shifted in a horizontal direction with regard to the covering plate 3, so that the bandage is also suitable for herniae situated higher or lower.

I claim:

1. In a springless hernia truss comprising a hollow elastic oval shaped pad having one face convexed and the edges of said face being inturned, forming a flange, grooved on its periphery, a base plate of stiff material closing the base of the pad and set in said groove, said base plate being formed with a threaded opening in a substantially central portion thereof, an arched cover plate of rigid material with the surface of which a supporting belt engages, said cover plate being of less dimensions than the elastic pad and having edges which contact with the inturned flange of said pad and formed with a transverse slot therein in which a belt may slidably extend, and an opening in said cover plate below said belt slot, and a screw extending through said last mentioned opening and engaging in said threaded opening in said base plate whereby the base plate may be caused to bind the rubber of said pad between it and said base plate and exerting a substantial uniform pressure over the whole surface of the rubber pad when being worn.

2. A truss as set forth in claim 1 further characterized by said elastic pad having the flange cut away at one end edge thereof, a shank strap having an opening in one end through which said screw passes and being disposed between said base plate and said cover plate through the cut away edge portion of said flange.

3. A truss as set forth in claim 1 further characterized by a base plate having threaded openings in the end portions thereof for receiving said screw, whereby the pad can be shifted above or below the cover plate without requiring an adjustment of the belt on the body of the wearer from its accustomed position.

4. A truss as set forth in claim 1 further characterized by a cover plate having an opening in the outer wall of the strap slot in alignment with the screw receiving opening of the inner wall of the strap slot, whereby an adjustment of said screw may be made when the belt is removed from the slot so as to effect an adjustment of the cover plate toward or from the pad to increase or diminish the pressure required by the wearer.

FRIEDRICH ALBERT HAMANN.